United States Patent
Hein et al.

(10) Patent No.: US 7,805,111 B1
(45) Date of Patent: Sep. 28, 2010

(54) FAST LOG-RADIAL WIRELESS TERRAIN PROPAGATION PREDICTION METHOD

(75) Inventors: Carl Edward Hein, Cherry Hill, NJ (US); Timothy A. Bieniosek, Philadelphia, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 842 days.

(21) Appl. No.: 11/121,509

(22) Filed: May 3, 2005

(51) Int. Cl.
*H04B 7/00* (2006.01)

(52) U.S. Cl. .................. 455/67.14; 455/67.11; 455/423

(58) Field of Classification Search ............. 455/450, 455/446, 67.14, 67.11, 67.16, 504, 423, 524, 455/67.13
See application file for complete search history.

(56) References Cited

U.S. PATENT DOCUMENTS 5,063,604 A * 11/1991 Weiman ..................... 382/170
6,115,580 A * 9/2000 Chuprun et al. ............... 455/1
6,285,664 B1 * 9/2001 Bernstein et al. ............ 370/318
6,771,609 B1 * 8/2004 Gudat et al. ................. 370/254
6,785,547 B1 * 8/2004 Heiska et al. ................ 455/446
7,171,210 B2 * 1/2007 Vicharelli et al. ........... 455/446
7,205,938 B2 * 4/2007 Davi et al. ................... 342/451
7,349,490 B2 * 3/2008 Hunton ....................... 375/296

* cited by examiner

*Primary Examiner*—Melur Ramakrishnaiah
(74) *Attorney, Agent, or Firm*—Duane Morris LLP

(57) ABSTRACT

Wireless system electromagnetic propagation or attenuation design or analysis is performed by determining (by calculation or empirically) the attenuation between all sets of grid points of a terrain. To make the information readily available, the results of the determinations are stored in computer memory. The information is stored in the form of bytes representing integer values of decibels, and the information is stored only for those grid points corresponding to a log-radial (log-polar) mapping. In order to use the data for analysis or design, the desired values are estimated from the log-radial mapping.

9 Claims, 5 Drawing Sheets

FAST LOG-RADIAL WIRELESS TERRAIN PROPAGATION PREDICTION METHOD

FIELD OF THE INVENTION

This invention relates to methods for accessing information relating to the attenuation of electromagnetic signals between various locations of known terrain.

BACKGROUND OF THE INVENTION

It is often necessary to determine the propagation characteristics of wireless signals, as for example during design and planning of mobile networks for civilian or military use. Generally speaking, simulation models require attenuation values between pairs of locations or points on a terrain map. In this planning with simulation modeling, the point-to-point attenuation or propagation of electromagnetic signals may have to be calculated not only between two identified locations, but more generally between locations of "transmitters" and "receivers" which may both be in motion. The calculations must therefore be performed for path characteristics between each and every possible point in a terrain and every other possible point. These calculations are performed by computer, or the information may be generated empirically, but in either case a vast amount of data must be processed to produce the attenuation information.

New attenuation values are needed during simulations as the locations of the transmitter and receiver move and also as they change frequency. The calculations (or empirical tests) are time-consuming because two-dimensional integration must be performed between each transmitter-receiver pair, such as pair A-B, to account for the terrain elevations at all points between A and B which may obstruct or partially attenuate the signal. The path's width depends upon the bandwidth of the signal, and generally subtends a small apparent angle around B as seen from A, and vice-versa. The primary field of influence between A and B therefore produces a convex hull due to wave-spreading with distance. The degree to which the complex hull is truncated or obstructed by the terrain determines the amount of attenuation between A and B. A 3-dimensional computation must be performed for each of thousands of intervening points for each propagation calculation.

FIG. 1 represents a logic flow chart or diagram of the prior-art Longley-Rice Irregular Terrain Model (ITM) method. In FIG. 1, the logic Longley-Rice ITM method begins at a START block 12, and the logic then flows to a further block 14, which represents accessing information relating to the frequency or frequencies of the electromagnetic radiation. The logic flows to block 16, which represents the importation of a terrain map, which should preferably include at least elevation characteristics of the terrain. The terrain map either includes a grid of possible locations for the transmitter and receiver, or the terrain map is modified in a block 18 to include such locations. FIG. 2 illustrates a rectangular terrain plot 210 with an array 212 of possible location grid points, represented as dots. A first grid point in terrain 210 is designated $212_{x=1,y=1}$.

In FIG. 1, the logic flows from block 18 to block 20, which represents the initial setting of the transmitter location to a first value of x,y. Block 22 represents integration of the attenuation between the initial transmitter location and the next adjacent location to produce an attenuation value for this physical interval. From block 22, the logic flows to a decision block 24, which determines if the current value of y is the maximum possible value for the terrain in question. If the current value of y is less than the maximum possible value, the logic leaves decision block 24 by the NO output, and proceeds to a block 26. Block 26 increments the current value of y to y+1, and the logic returns to block 22 by way of a logic path designated 26o. The logic iterates around the loop including blocks 22, 24, and 26, producing integrated values of attenuation for each point, until the current value of y reaches $y_{max}$. Thus, blocks 22, 24, and 26 together represent an iterative evaluation of attenuation between the starting value of x,y for (to) each possible value of y at the given value of x. At the time at which y reaches $y_{max}$, the logic leaves decision block 24 by the YES output, and proceeds to a block 28. Block 28 represents the incrementing of variable x to x+1. The logic returns to block 20, which initializes the transmitter position to a new value of x,y. The logic then again proceeds to blocks 22, 24, and 26, which again produce values of attenuation between the original x,y location set by block 20 and (to) each possible value of y for the given value of x. Thus, the logic including blocks 20, 22, 24, 26, and 28 iteratively selects all possible x,y starting locations of set 212 of FIG. 2, and for each such starting location, determines the attenuation between that starting "transmitter" location and every possible "receiver" location. As each attenuation value is generated, the starting or transmitter location, the receiver location, and the attenuation can be read at an output data port such as 30.

A possible improvement on the arrangement of FIG. 1 is to perform the method of FIG. 1 for all possible paths or locations in the terrain, and storing the results in memory for use as required. However, the storage requirements are beyond the ability of currently available computers for high resolution results. This can readily be understood by referring to FIG. 3a, which represents the contents of one memory location or portion associated with storage of the results from port 30 of FIG. 1. More particularly, FIG. 3a represents a corner of terrain 210 of FIG. 2, in which only the location $212_{x=1,y=1}$ associated with the first terrain location is shown. The memory portion associated with location $212_{x=1,y=1}$ of FIG. 3a is designated $312_{x=1,y=1}$. Memory portion $312_{x=1,y=1}$ of FIG. 3a is only one location in a memory designated generally as 312 in FIG. 3a. The contents required of memory portion $312_{x=1,y=1}$ is suggested by the contents of memory portion $312_{x=1,y=1}$ of FIG. 3a. More particularly, the memory portion $312_{x=1,y=1}$ associated with the first location $212_{x=1,y=1}$ must contain the attenuation information between the first location $212_{x=1,y=1}$ and each other location on the terrain. If the terrain 210 has a set of NXN locations, the first memory portion $312_{x=1,y=1}$ must have $N^2$ sites. In order to store the corresponding information for each of the NXN locations 212 of FIG. 2, the memory must have NXN memory portions, each capable of storing NXN pieces of information. Thus, a memory capable of storing the attenuation data must have a number of portions or storage locations proportional to $N^2 \times N^2$ or $N^4$, where N is the number of locations in one dimension (along one edge) of the terrain. Such large numbers of storage locations are currently impractical, especially since the number of points in the terrain may be large.

FIG. 3b illustrates represents a memory portion $312_{x=p,y=q}$ corresponding to memory portion $312_{1,2}$ of FIG. 3a, but "located" or associated with a location p,q near the center of terrain 210 of FIG. 2. Memory portion $312_{x=p,y=q}$ is also a part of memory 312. Memory portion $312_{x=p,y=q}$ must contain the attenuation information between the location $212_{x=p,y=q}$ and each other location on the terrain, as suggested by the arrows radiating from location p,q within memory portion $312_{x=p,y=q}$. In order to maintain FIG. 3b uncluttered, only some of the arrows are illustrated. The number of bytes which the memory portion of FIG. 3b must hold is equal to that of the memory portion of FIG. 3a.

Thus, the current state of the art is to calculate the attenuation between locations of a terrain as needed. Improved methods are desired for accessing attenuation information.

SUMMARY OF THE INVENTION

Thus, according to an aspect of the invention, wireless system electromagnetic propagation or attenuation design or analysis is performed by determining (by calculation or empirically) the attenuation between all sets or pairs of grid points of a terrain. To make the information readily available, the results of the determinations are stored in computer memory. The information is stored in the form of bytes representing integer values of decibels, and the information is stored only for those grid points corresponding to a log-radial (log-polar) mapping. In order to use the data for analysis or design, desired values are estimated from the values in the log-radial mapping.

A method according to an aspect of the invention is for operating on information relating to the attenuation of electromagnetic signals traversing a terrain. The method comprises the steps of determining point-to-point attenuation across the terrain, and loading a memory with the point-to-point attenuation in a log-radial pattern. The information is accessed from the memory and the attenuation of electromagnetic signals between locations of the terrain using some form of estimation. In a particular mode of this aspect of the method, the estimation may be performed by interpolation.

In a particular mode of the method, the step of determining point-to-point attenuation across the terrain is performed empirically. In another mode, the step of determining point-to-point attenuation across the terrain is performed by use of a prior-art computational technique based on a terrain map, which may include elevation information. The determination of point-to-point attenuation across the terrain may be performed by use of a prior-art computational technique based on a terrain map, and including the step of making the determination at a selected frequency. The prior-art computational technique may include a Longley-Rice computational technique. Use of the information from the memory further includes the steps of estimating the desired attenuation value from one or more log-radial points in memory.

A method for determining the attenuation of electromagnetic signals traversing a terrain according to another aspect of the invention comprises the steps of determining the frequency of the electromagnetic signals, determining at least elevation characteristics of the terrain between transmission and reception locations, and from the frequency and the characteristics of the terrain, determining point-to-point attenuation across the terrain. A memory is loaded with the point-to-point attenuation in a log-radial pattern, and the memory is accessed using a log-radial estimation to determine the attenuation of electromagnetic signals between locations of the terrain.

DESCRIPTION OF THE INVENTION

One possible approach to accelerate the repeated access of propagation or attenuation values during simulations is to pre-calculate the values once, for a relatively coarse grid, and store the values in a table. Retrieval of the information during a simulation would require only retrieval and interpolation of the data. This does not much ameliorate the basic problem, however, since the dimensions of such a database would hinder access times due to swapping/caching inefficiencies and disk seek latencies. It appears that the memory dimensions would be roughly $N^4/2$ even if frequency changes are not taken into account, where N is the number of grid points along an edge of the terrain in question. This is because a sub-table of $(N-1) \times (N-1)$ entries is needed at each grid point to specify the attenuation to each of the other grid points, and one of these sub-tables is needed for each of the NXN grid points. Assuming symmetry, the total table could be reduced by a factor of 2. Thus, the "rectangular" memory structure would be $(N-1)-(N-1) \times N \times N/2$. If attenuation values were recorded as a single byte, in dB, then a 50 km×50 km grid with 50-meter spacing between adjacent grid points (N=1000) would require 0.5 terabytes of storage, corresponding to 500 GB. It would be desirable to use only a few hundred megabytes, about what would fit on a CD ROM. Such an amount of data would fit conveniently on a hard drive, and would for the most part stay resident in random-access memory (RAM) of an ordinary personal computer.

It has been discovered that the abovedescribed "rectangular grid" method for storing data provides greater resolution than is warranted by the type of calculations being performed. The nature of electromagnetic propagation is such that storage of data at small increments at long ranges provides more resolution than is necessary, and the memory requirements thereby imposed forces the use of greater granularity than desired at short ranges. A log-polar attenuation storage method according to an aspect of the invention ameliorates/ the accuracy and efficiency.

Figure 1:
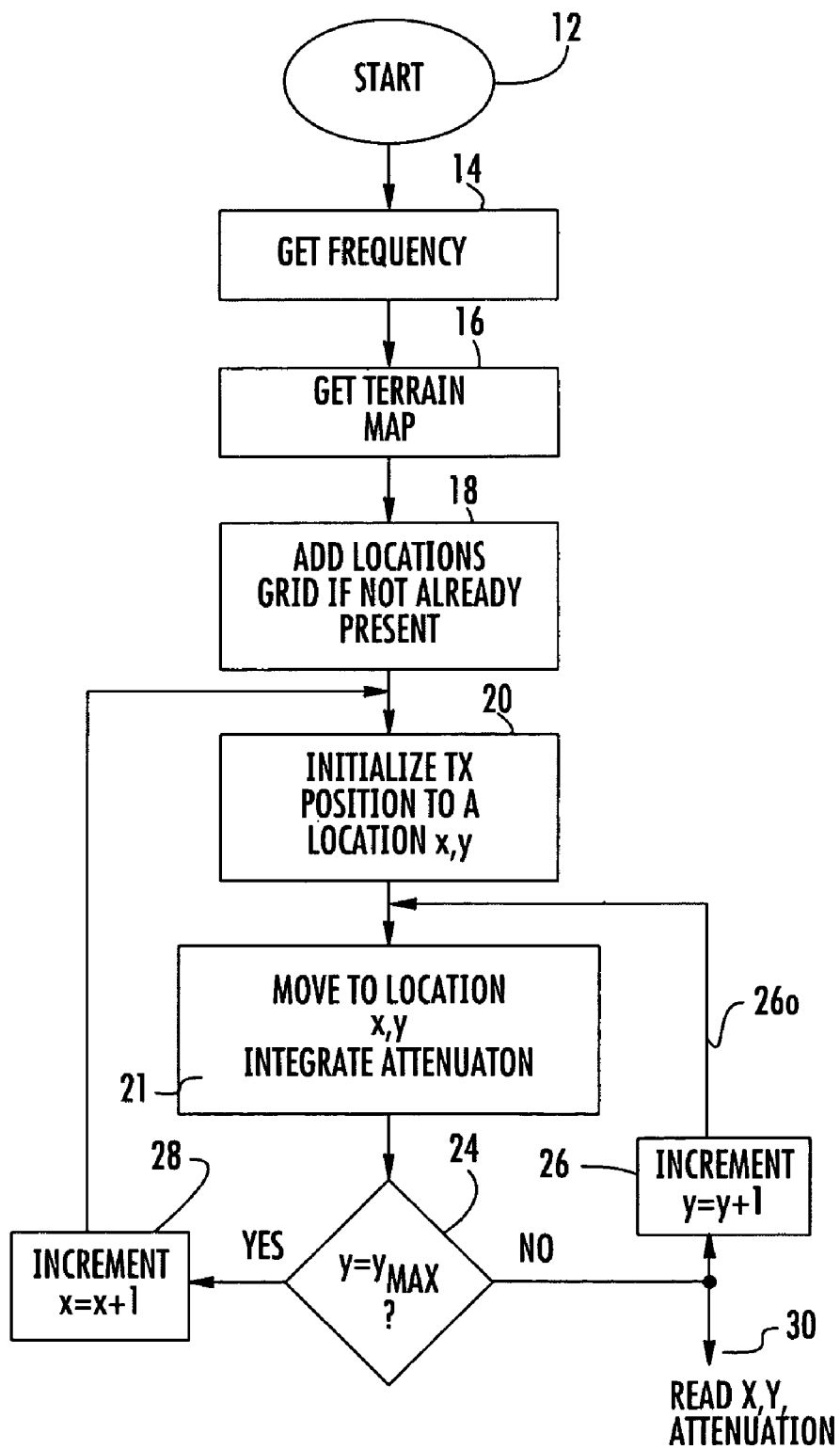
FIG. 1 is a simplified representation of a flow chart or diagram for iteratively calculating attenuation between various points or locations of a terrain and other points.
Figure 2:
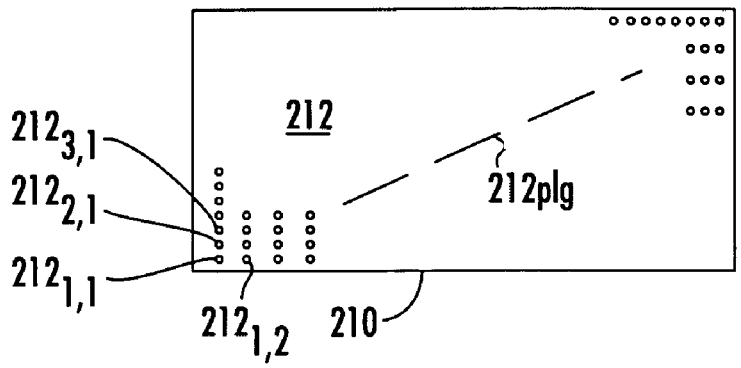
FIG. 2 is a simplified plan view illustration of a terrain portion with a set or array of locations defined thereon.
Figure 3A:
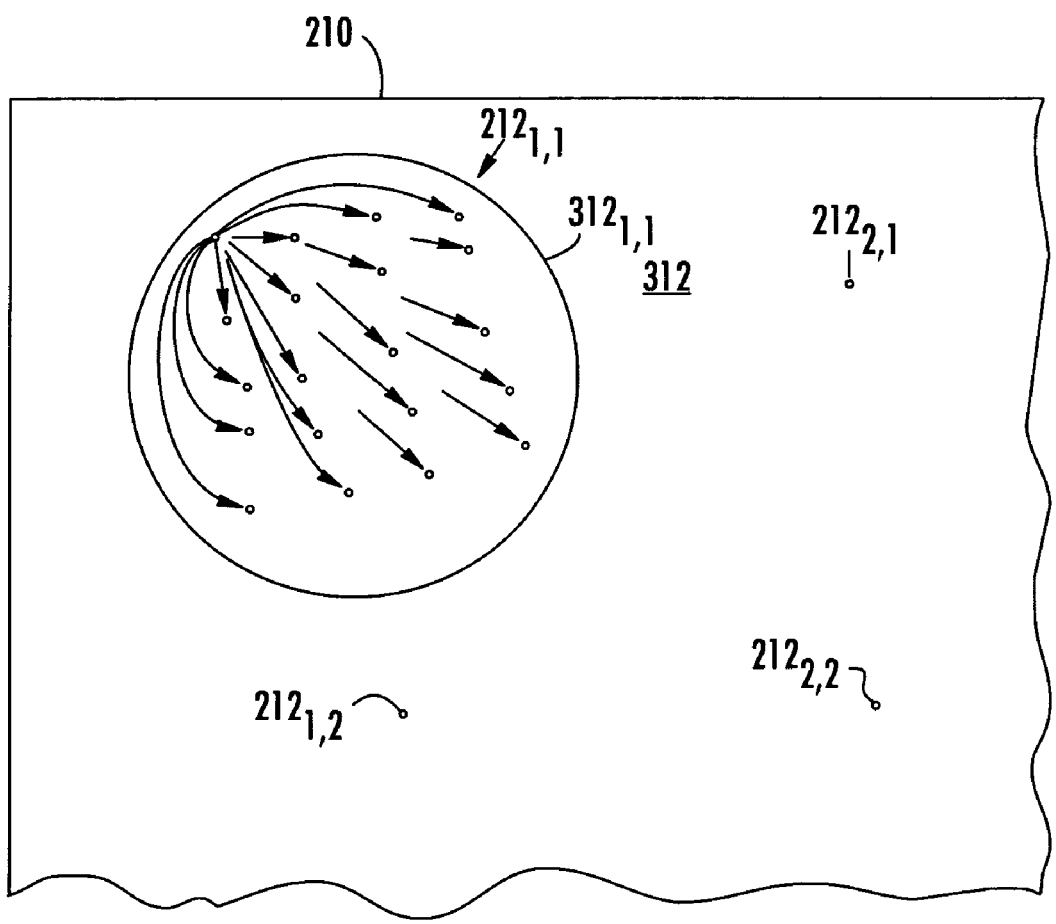
FIG. 3a is a representation of a memory portion associated with one location at the edge of the set or array of locations of FIG. 2, for storing all the data associated with the one location.
Figure 3B:
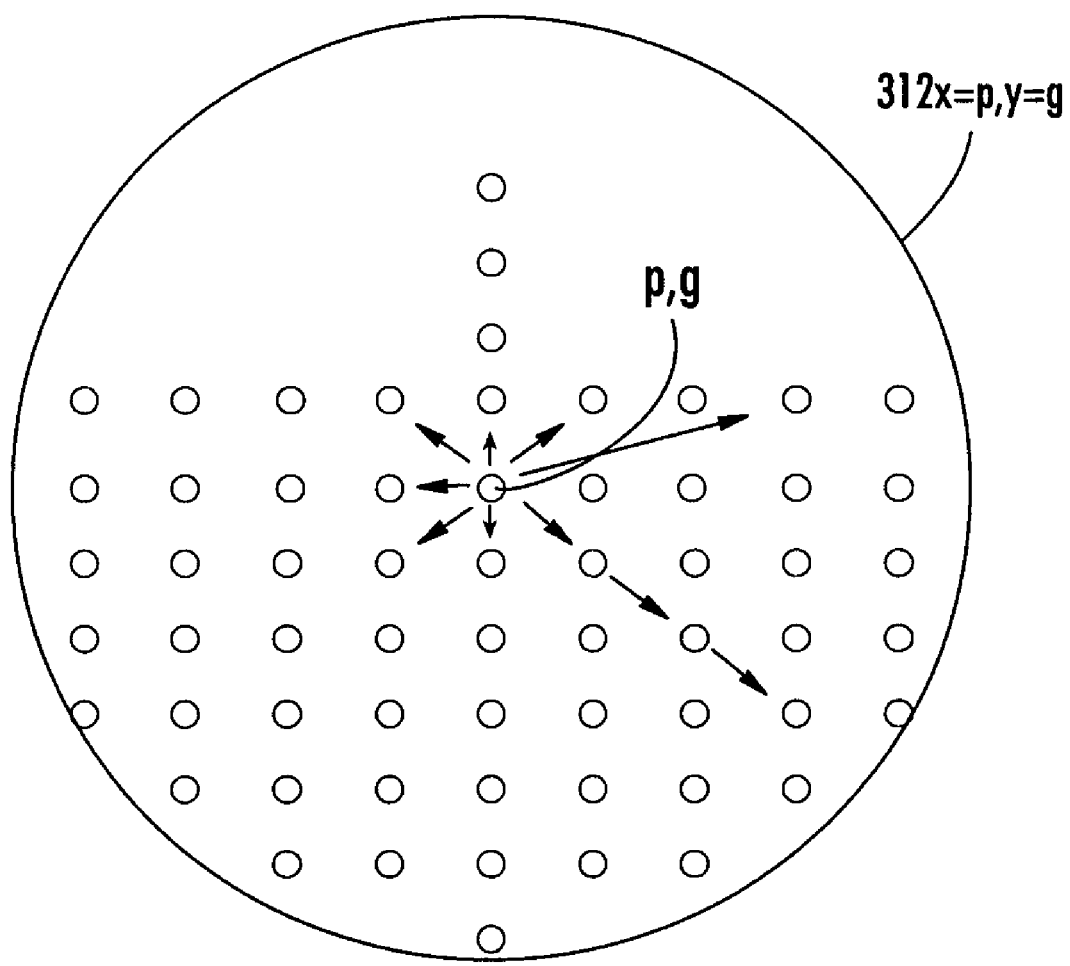
FIG. 3b is a similar representation of a memory portion associated with a location in the middle of the set or array of locations of FIG. 2.
Figure 4:
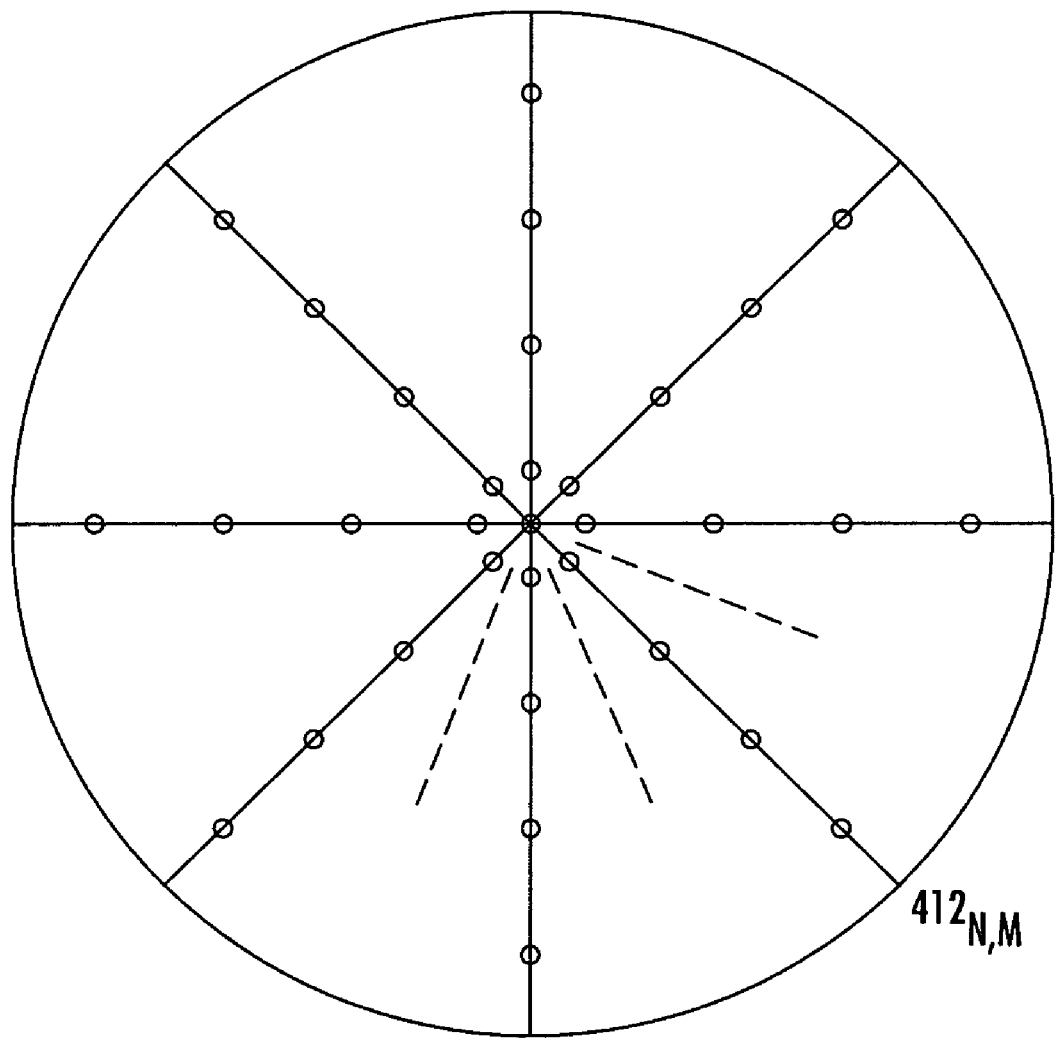
FIG. 4 is a simplified representation of the information stored in a memory portion associated with one terrain location of FIG. 2 according to an aspect of the invention.

According to an aspect of the invention, the determination of the attenuation between the various locations of the terrain is made in the prior-art manner, as suggested by FIG. 1. However, the storage of the attenuation data in memory is made in a log-radial or log-polar fashion, and the desired attenuation value is estimated from data extracted from memory.

The log-polar terrain propagation technique according to an aspect of the invention stores pre-calculated (or pre-measured, if desired) attenuation values as a series of concentric rings around each grid point. Each attenuation value can be (but is not required to be) stored as a single byte in dB over a 100-dB range with 0.4 dB resolution. A random Rayleigh fading function is applied on top of this on each access to model multi-path scattering and diminishes the need for more resolution. In addition, an $R^\gamma$ function, where R is the range and $\gamma$ ranges from 2 to 4, is further superimposed to match the natural dynamic-range-with-distance profile and to provide smoother interpolation between grid-points: Each ring is divided into angular segments, such as Na=20, so that attenuation values can be placed at each "intersection" of an angle with a ring. The use of twenty angular segments provides a maximum angular error of only 9°, which is quite suitable for typical radio directionality. A number Nr of rings are spaced logarithmically outward from each grid point. For example, seven rings could be spaced at kilometer distances of 0.4, 0.8, 1.6, 3.2, 6.4, 12.8, and 25.6, respectively. Locations between and beyond the rings can be interpolated or extrapolated or otherwise estimated by accessing the nearest points. Points near sharp terrain gradients could be given higher resolution sections.

In the case of computerized calculation, a determination is made as to whether or not the information will be stored in memory at the time at which the attenuation between a start (transmitter) location and a given end (receiver) location is determined. In general, those locations are provisionally selected for information storage which lie on a radial $\phi=2\pi/n$, and those which do not lie on such radials are not selected. The number n is determined by the resolution desired. In addition, among those locations which lie on the selected radials, information is stored only for those radial locations which correspond to or lie on the logarithmically located rings as determined by $R=K2^j \cdot dr$, where j is an integer index and r is the distance along the radial R.

Thus, in a specific example, $2^j$ takes on values of 1, 2, 4, 8, 16, and 32 for values of j equal to 0, 1, 2, 3, 4, and 5, respectively. Assigning K a value of 0.4 kilometers, the corresponding radii R become 0.4, 0.8, 1.6, 3.2, 6.8, and 13.6 km, respectively. Taking 20 angular increments as being reasonable for the purpose, the angles will increment by 360°/20=18°. Thus, the angles might be 0°, 18°, 36°, 54°, 72°, 90°, 108°, 126°, 144°, 162°, 180°, 198°, 216°, 234°, 252°, 270°, 288°, 306°, 324°, and 342°. The attenuation is calculated for all the log-radial grid points, and those calculated values are stored in memory.

Figure 5:
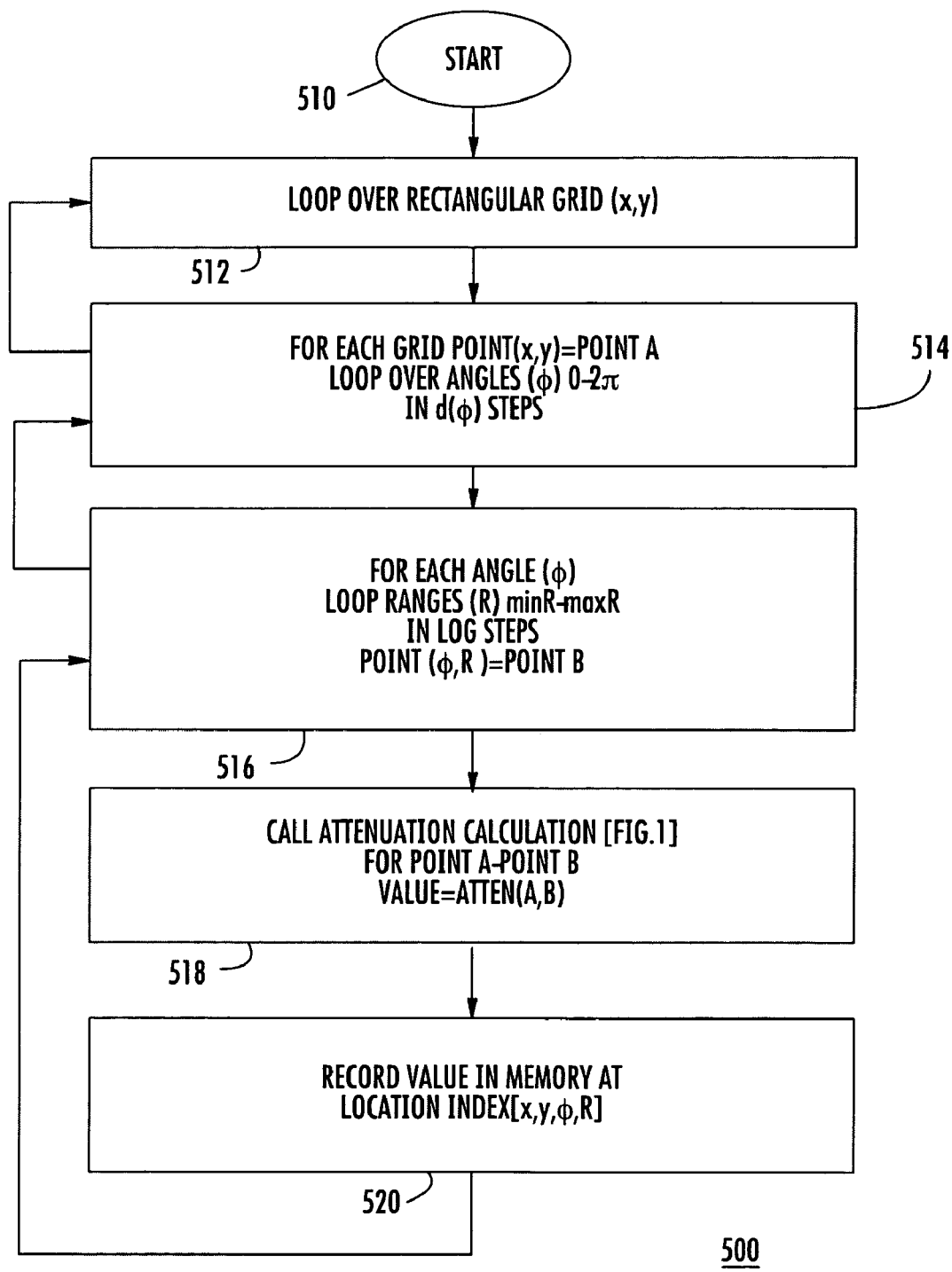
FIG. 5 is a simplified flow chart or diagram of a logic flow according to an aspect of the invention for receiving data from the attenuation calculation arrangement of FIG. 1 for determining if the information is to be stored in the memory.

FIG. 5 is a simplified logic flow chart or diagram 500 illustrating how the attenuation calculations of FIG. 1 are activated and the resulting values are stored in log-radial memory. In FIG. 5, the logic begins at a START block 510 and proceeds to a block 512. Block 512 represents looping over the rectangular grid (x,y) to sequentially access or sample each grid point. At each grid location x,y (considered as a point A), block 514 the logic sequentially accesses each and every angle $\phi=0°$, $0°+Nd(\phi)$ about the point A, where N+1 is the number of angles selected. For each of these angles, the logic of FIG. 5 proceeds to a block 516, which represents sequentially accessing each log range from minR to maxR, to thereby define a location or point B=($\phi$,R). From block 516, the logic flows to a block 518, representing the calling of the attenuation calculation algorithm of FIG. 1 for determining the attenuation from Point A to point B, to thereby produce a value=atten (A,B). When each value of attenuation is calculated, the logic of FIG. 5 flows to a block 520, representing the recording of the value of attenuation in memory at index [x,y,$\phi$,R]. The logic then leaves block 520 and returns to block 516 to begin the calculation for a new log range. When the atten(A,B) has been calculated and stored for all values of $\phi$ about the current location or point, the logic leaves block 516 and returns to block 514, to select another angle $\phi$ about the selected grid point. When all the angles about the current grid point have been accessed, the logic leaves block 514 and returns to block 512, to thereby select a new grid point. The logic continues until the described acts have been performed for all the grid points selected by block 512.

When attenuation values are retrieved from memory, the precise coordinates desired may not have been stored. In this case the desired values must be estimated using the stored values.

The log-polar or log-radial technique according to the invention requires KXNXN bytes, where K=Na×Nr, Na is the number of angular radials and Nr is the number of rings. Assuming these parameters, the memory required for each grid point is 7×20 bytes or 140 bytes, and a 50×50 Km grid with 50 meter spacing between points (N=1000) would require a total of only 140 Mbytes of storage. In this particular example, the reduction in total memory requirement is 500/0.14=3571:1 by comparison with the "rectangular" grid method describe above.

While the described method for estimating the value of the attenuation involves linear interpolation, other methods of estimation may be used.

Thus, according to an aspect of the invention, wireless system electromagnetic propagation or attenuation design or analysis is performed by determining (by calculation or empirically) the attenuation between all sets (212) or pairs of grid points of a terrain (210). To make the information readily available, the results of the determinations are stored in computer memory (312). The information is stored in the form of bytes representing integer values of decibels, and the information is stored only for those grid points corresponding to a log-radial (log-polar) mapping. In order to use the data for analysis or design, the desired values are estimated from the log-radial mapping.

What is claimed is:

1. A method for operating on information relating to attenuation of electromagnetic signals traversing a terrain, said method comprising the steps of:
   providing a grid of points representing various locations of the terrain, each of said points representing one of said locations of the terrain;
   converting said grid of points into a log-radial pattern of points using a computer;
   determining point-to-point electromagnetic signal attenuation values for pairs or sets of said log-radial points; and
   storing said attenuation values for said pairs or sets of said log-radial points in a computer memory.

2. A method according to claim 1, wherein said step of determining point-to-point electromagnetic signal attenuation values is performed empirically.

3. A method according to claim 1, wherein said step of determining point-to-point electromagnetic signal attenuation values is performed by said computer based on a terrain map including said grid of points.

4. A method according to claim 3, wherein said terrain map includes elevation information.

5. A method according to claim 3, wherein said computer performs the step of making said determination at a selected frequency.

6. A method according to claim 3, wherein said computer performs a Longley-Rice computational technique.

7. The method according to claim 1, further comprising the step of estimating point-to-point electromagnetic signal attenuation values for pairs or sets of points not corresponding to the pairs or sets of log-radial points, from said attenuation values for said pairs or sets of said log-radial points stored in the computer memory.

8. A method for determining attenuation of electromagnetic signals traversing a terrain, said method comprising the steps of:

determining a frequency of the electromagnetic signals;

providing a grid of points representing various transmission and reception locations of the terrain, each of said points representing one of said locations of the terrain;

determining at least elevation characteristics of said terrain between said transmission and reception locations;

converting said grid of points into a log-radial pattern of points using a computer;

from said frequency and said characteristics of said terrain, determining point-to-point electromagnetic signal attenuation values for pairs or sets of said log-radial points; and storing said attenuation values for said pairs or sets of said log-radial points in a computer memory.

9. The method according to claim 8, further comprising the step of estimating point-to-point electromagnetic signal attenuation values for pairs or sets of points not corresponding to the pairs or sets of log-radial points, from said attenuation values for said pairs or sets of said log-radial points stored in the computer memory.

* * * * *